April 8, 1941.   W. W. VAN DER CLUTE   2,237,534
FISHING LURE
Filed Jan. 31, 1938   2 Sheets-Sheet 1
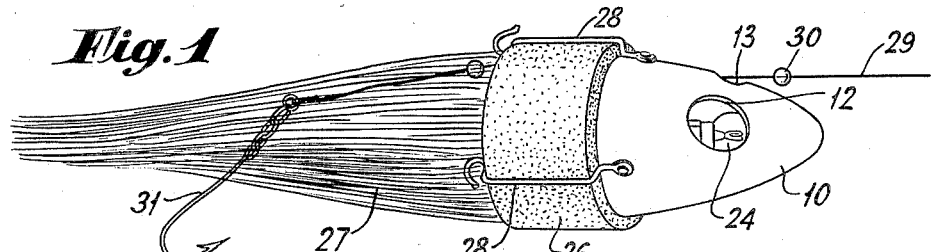
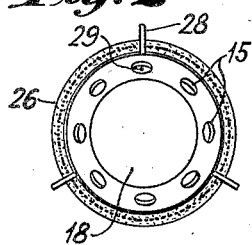 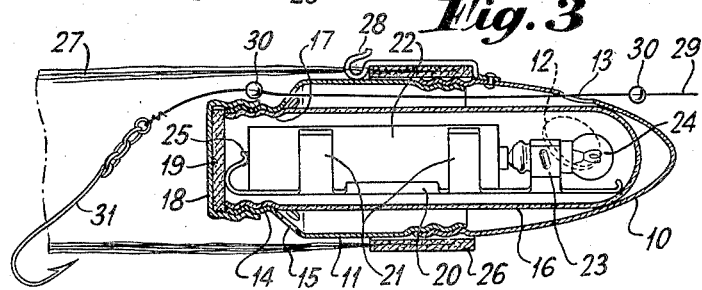
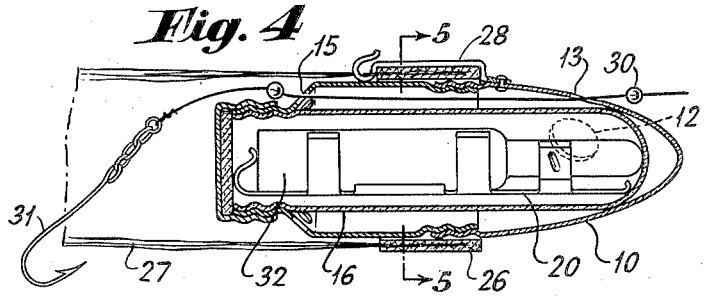 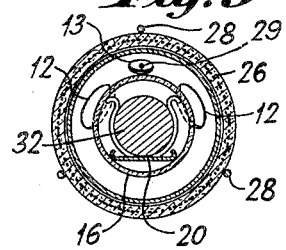
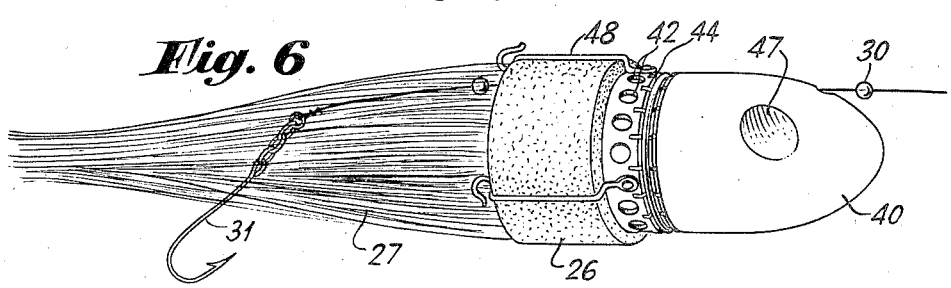
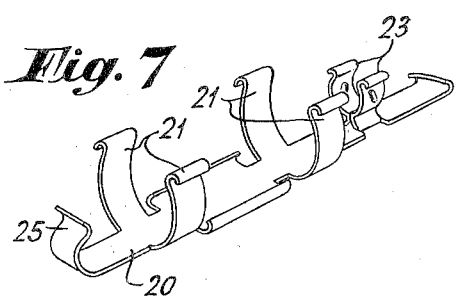 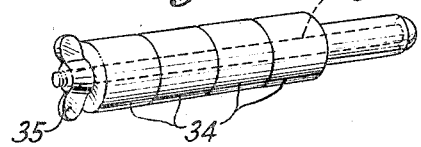
INVENTOR.
WILLIAM W. VAN DER CLUTE
BY William A. Zalesak
ATTORNEY.

April 8, 1941.   W. W. VAN DER CLUTE   2,237,534

FISHING LURE

Filed Jan. 31, 1938   2 Sheets-Sheet 2

INVENTOR.
WILLIAM W. VAN DER CLUTE
BY William A Zalesak
ATTORNEY.

Patented Apr. 8, 1941

2,237,534

UNITED STATES PATENT OFFICE 2,237,534

FISHING LURE

William W. Van der Clute, Elizabeth, N. J.

Application January 31, 1938, Serial No. 187,893

19 Claims. (Cl. 43—44)

My invention relates to improvements in fishing lures or artificial baits.

The principal object of my invention is to provide an animated fishing lure, the appearance and component parts of which can be readily changed so that it is suitable for both day and night fishing, large and small fish, and for surface fishing or deep fishing.

More specifically the objects of my invention are to provide a lure having interchangeable parts, more particularly tail pieces, and to provide a lure which can be illuminated both at the front end and rear end, particularly the tail pieces, and a lure, the weight of which can be readily varied to make it suitable for fishing at different depths.

Other objects are to provide simple, effective and readily replaceable illuminating means for fishing lures and to provide a lure with a novel, effective and animated tail portion.

Briefly, my invention comprises a hollow or outer body portion or shell containing within it an inner tubular, transparent member containing an illuminating device or provided with a weight, the outer shell being provided with perforations at the front and rear whereby a flow of water into and through the outer housing is permitted. An easily detachable tail portion is secured around and to the outside housing. The water passing through the lure passes through and into the inner portion of the lure to give the tail pieces an animated movement in the water. The illuminating device and its holder are easily replaceable as well as the weights, and the tail portion can be changed to vary the appearance and size of the lure. The lure is slidably mounted on a lead wire to the end of which is attached the hook.

Figure 8:
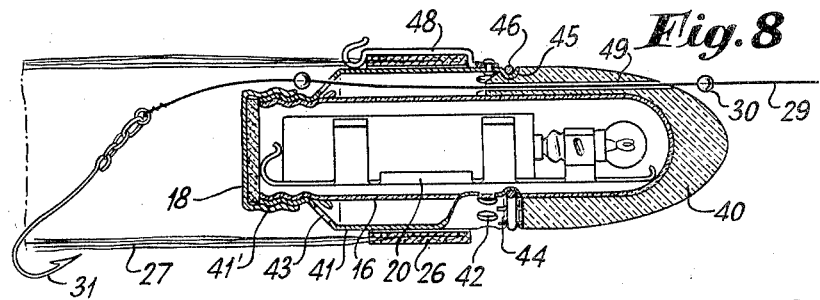
Figure 9:
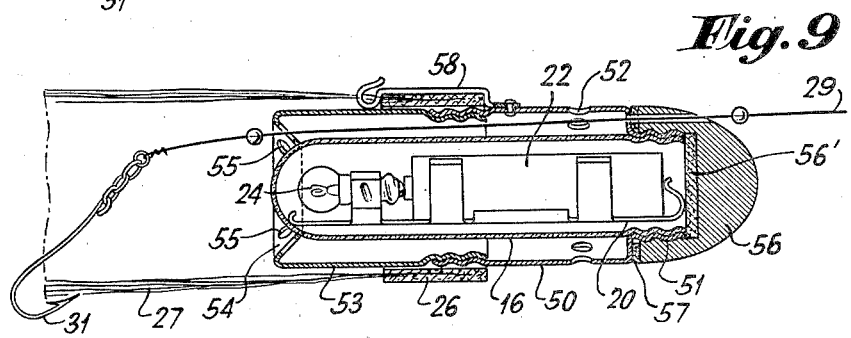
Figure 10:
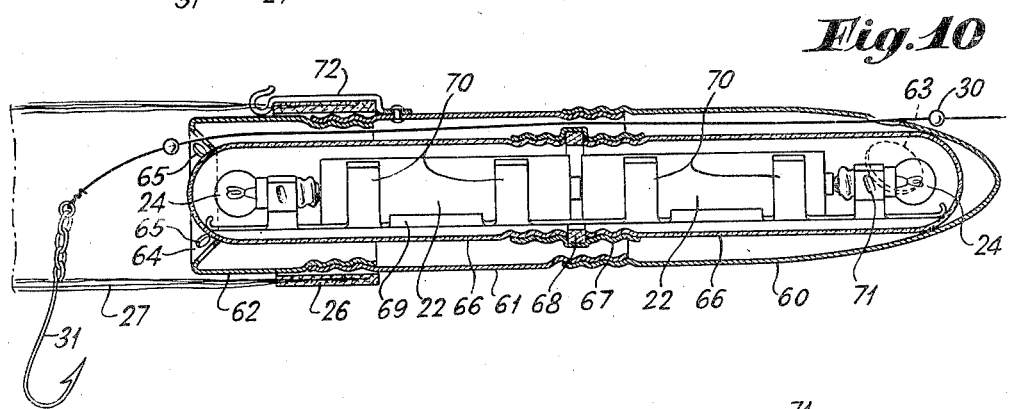
Figure 11:
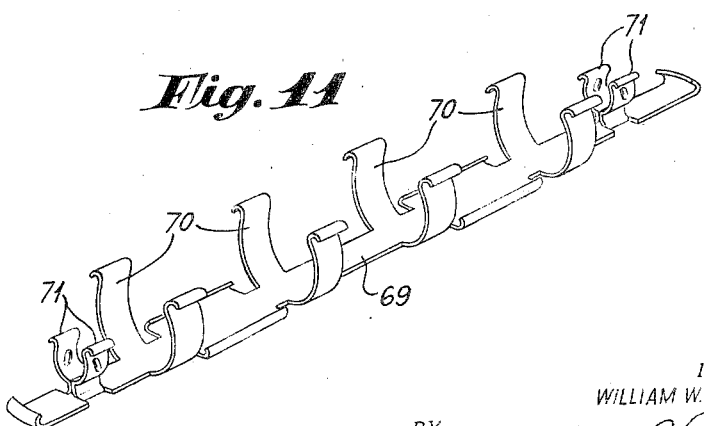

The novel features which I believe to be characteristic of my invention are set forth with particularity in the appended claims, but the invention itself will best be understood by reference to the following description taken in connection with the accompanying drawings in which Figure 1 is a perspective view of one form of fishing lure embodying my invention, Figure 2 is a left end view of Figure 3, Figure 3 is a vertical section of the lure shown in Figure 1, Figure 4 is a vertical section of a modification made according to my invention, Figure 4a shows a detail of construction, Figure 5 is a section taken along the line 5—5 of Figure 4, Figure 6 is a perspective view of a still further modification of my invention, Figure 7 shows a detail of construction, Figure 8 is a vertical section of the lure shown in Figure 6, Figures 9 and 10 are vertical sections of further modifications of lures made according to my invention, and Figure 11 shows a detail of construction employed in the lure shown in Figure 10.

Referring to Figures 1 to 3 inclusive, the lure comprises an elongated hollow body or shell and including a front part 10 and the rear part 11 screwed together to form a housing. The front part is provided with a pair of openings or apertures 12 simulating eyes and performing a function to be later described. This front part is also provided with another aperture 13 through which a lead line may extend. The rear part is provided at its rear end with a screw portion 14 and apertures 15, the function of which will later be described. Mounted within the screw portion is a transparent tubular member in the form of a tube 16 closed at one end and having screw portion 17 at its other end engaged in the screw portion 14 of the rear part of the housing. The end of the transparent tube is sealed by means of cap 18 and gasket 19, the cap being screw around the outside of the screw portion 14 of the rear part of the housing. This provides a water-tight transparent support for an illuminating device including a cradle 20 best shown in Figure 7 provided with arms or clips 21 for supporting a battery 22 and other clips or arms 23 for supporting a light bulb 24. A bow spring 25 at the rear of the cradle forces the battery and light into contact with each other, the circuit being completed through the cradle which may be of metal. The light from this illuminating device shines through the eye apertures and the rear apertures 15 in the rear part of the housing. This illuminating device of the lure may be quickly removed and replaced at any time. Mounted on the housing is a removable tail piece comprising a tubular member or collar 26 having rearwardly extending resilient streamer-like elements 27 which may be hairs or feathers or like material for providing a tail effect. The tail piece is removably engaged to the body portion by means of a plurality of spring clips 28 carried by the forward part 10 of the lure housing.

A lead line 29 extends through the apertures 13 and 15 and is provided with a pair of stop beads 30 for positioning the lure on the line. A hook 31 is attached to the end of the line. In this way the entire strain is placed on the hook when engaged in a fish. Because of the construction of the tail piece it can be readily removed to permit various other types of tail pieces being attached for different types of fish without removing the lure from the lead line. While spring clips are shown for engaging the tail piece, other equivalent means can be used.

If desired the illuminating device can be removed and replaced by a weight 32, such as shown in Figures 4 and 5, for permitting fishing at different depths, various weights being used in this connection. The positioning of the weight with respect to the tube 16 is clearly shown in Figure 5.

Because of the apertures in the outer housing, water can flow into the outer housing and between the outer housing and the inner tubular member housing the illuminating device. This prevents the lure from being too buoyant, and permits the water to flow through the housing and into the center of the tail portion, keeping the streamer elements separated and giving these elements an animated movement as the lure moves through the water. In addition the illuminating device is protected by a metal shell but is at the same time readily replaceable. Light emanating through the rear apertures 15 illuminate the animated tail from the interior of the tail. The cradle arrangement for the illuminating device is simple and effective and eliminates the need for switches operable from the outside of the water-tight casing, thus eliminating the possibility of any leaks around the switch mechanism into the casing. The construction of the tail piece places the hook portion within the tail piece but at the same time permits removal of the tail piece so that others can be used for different size and different kinds of fish.

The form of weight shown in Figure 4 can be replaced by the form shown in Figure 4a, which comprises a threaded rod 33 having a plurality of removable sections 34 whereby the total weight may be changed at will, the weights being maintained in place by wing nut 35.

In Figures 6 and 8 are shown a perspective view and a vertical section of a modification of a lure made according to my invention. A two-part housing comprises a forward transparent nose portion 40, preferably of glass, and a rear portion 41 of metal having apertures 42 at the front end and apertures 43 at its rear end for purposes described above. The transparent tube 16 supporting the illuminating device is secured in the screw portion 41' of the housing, a water-tight seal being provided by a cap 18 such as shown in Figures 3 and 4. The front end of the part 41 of the housing is provided with a plurality of spring fingers 44 engaged in a groove 45 in the nose piece 40 and locked in position by a split resilient ring 46. The lead line 29 extends through a bore 49 and one of the apertures 43, the tail piece 26 being maintained in removable relationship with the housing member by means of springs 48. In this form the entire forward portion of the lure is brightly illuminated by the illuminating device carried within the lure. As best shown in Figure 6, depressions 47 for simulating eye pieces are located in the head 40.

In Figure 9 I show a form of lure made according to my invention in which the rear portion of the lure is more brightly illuminated including the tail piece. In this form of my invention the housing comprises a front part 50 provided with screw portion 51 and apertures 52, and the rear part 53 having a reflector 54 provided with apertures 55, the two parts of the housing being screwed together as shown. Within the housing is the transparent tube 16 containing the illuminating device of the type described above in the other forms including a cradle 20, the battery 22 and the light 24. The transparent tube extends through and within the reflector 54 of the rear part of the housing. The front end of the tube is sealed water-tight by means of the cap 56 and gaskets 56' and 57 which can be of any suitable material such as cork or rubber. The tail piece comprising the collar 26 and streamer-like elements 27 are secured to the housing by means of the springs 58. In this form not only does the water flow through the lure to fluff out the streamer members and cause animated motion, but the streamer members are brilliantly illuminated from the interior increasing the attractiveness of the lure and its effectiveness.

In the form of my invention shown in Figure 10 I provide a lure having both front and rear illumination. It comprises a three-part housing consisting of parts 60, 61 and 62, the front part being provided with the aperture 63 and the rear part with the reflector 64 having apertures 65. The transparent tubular member in this case comprises a pair of transparent tubes 66 coupled together by means of the collar 67 into which the tubes are screwed and the gasket 68 which provides a water-tight seal. The cradle 69, provided with four pairs of resilient arms or battery clips 70 support batteries 22 and two pairs of resilient arms 71 supporting the lights 24 the circuit being completed through the lights and the batteries by means of the cradle when the lights are screwed or snapped into place. The lure is provided with the tail member comprising collar 26 and streamers 27 maintained in position by means of the spring clip members 72.

It will be observed that a number of parts of these various lures are interchangeable and may be used in one form or another. A lure made according to my invention provides an animated lure, the appearance and component parts of which may be readily changed so that it can be used for day or night fishing, large or small fish and fishing at various depths.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A fishing lure including a body member having an interchangeable tail member, said tail member including a tubular member surrounding and contacting said body member and provided with rearwardly extending flexible streamer elements, and resilient means on said body member and positively engaging said tubular member to clamp said tubular member between said resilient means and said body member for positioning and retaining said tail member on said body member.

2. A fishing lure including a body member and an interchangeable tail member including a collar having flexible streamer-like rearwardly extending elements, and spring clip members secured to and outside of said body portion and engaging said collar to retain said tail member on said body member.

3. A fishing lure including a body member and an interchangeable tail member and including a tubular member provided with rearwardly extending flexible streamer elements and means on said body member and cooperating with said tubular member for positioning said tail member positively engaged on said body member, and a lead line extending through said body member and said tubular member but permitting removal of the tail member without removing the lead line.

4. A fishing lure including a body member and an interchangeable tail member comprising a tubular member provided with rearwardly extending flexible elements and means on said body member and cooperating with said tubular member for mounting said tail member positively engaged on said body member, and a lead line extending through said body member and said tubular member, said lead line having a hook positioned at the end and within the flexible elements of the tail piece, said tubular member permitting removal of said tail member without removing the lead line and hook from said lure.

5. A fishing lure including a hollow body, an inner hollow member carried within said hollow body and mounted in spaced relationship with said hollow body, apertures in the front and rear ends of said hollow body permitting the flow of water through said hollow body and between said hollow body and inner hollow member and rearwardly extending flexible streamer elements secured to and around the outside of said body.

6. A fishing lure including a hollow body, an inner hollow member carried within said hollow body and mounted in spaced relationship with said body, and apertures in said body for permitting the flow of water into said hollow body and between said hollow body and the inner hollow member.

7. A fishing lure including a hollow opaque body, a water-tight transparent inner member within said hollow body and mounted throughout a greater part of its length in spaced relationship with said hollow body, an illuminating device within said waterproof transparent inner member, said hollow opaque body having apertures through which light rays can emanate and through which water can flow between the hollow opaque body and the inner transparent body.

8. A fishing lure including an elongated hollow metal body, a water-tight transparent inner member within said hollow metal body and mounted throughout a large part of its length in spaced relationship with said hollow body, an illuminating device within said water-proof transparent inner member, said hollow metal body having apertures at both ends through which light rays can emanate and through which water can flow between the hollow opaque metal body and the water-tight inner transparent body.

9. A fishing lure including a hollow shell, an inner member mounted within said shell for weighting said shell, said shell being provided with apertures for permitting the flow of water into said shell between said shell and inner member.

10. A fishing lure including a hollow shell, an inner member mounted within said shell for weighting said shell, said inner member including a plurality of removable sections whereby its weight can be varied, said shell being provided with apertures for permitting the flow of water into said shell between said shell and inner member.

11. A fishing lure comprising an elongated hollow shell, an interchangeable inner member mounted within said hollow shell for weighting said shell, said shell being provided with apertures at its opposite ends for permitting the flow of water into and through said shell between the shell and the inner member.

12. A fishing lure including a hollow shell, an interchangeable inner casing supported in spaced relationship within said shell and containing a weight, said inner casing being detachable to permit interchanging said weight, said shell being provided with apertures for permitting the flow of water into said shell and through said shell between the shell and the inner casing.

13. A fishing lure including an apertured hollow body member and an interchangeable tail member including a collar having flexible rearwardly extending streamer elements, and means on said body member for securing said collar on said body member, an inner casing within said hollow body member, said inner casing and hollow body member being provided with cooperating threads to permit ready removal of said inner casing from said hollow body member.

14. A fishing lure including a multi-part elongated hollow shell, one part of said shell being provided with a screw engaging portion, a transparent inner tubular member closed at one end and provided at the other end with a screw portion for engaging the screw engaging portion of said one part of said shell, and a cap cooperating with said screw portions for sealing the inner tubular member with a water-tight seal.

15. A fishing lure including a multi-part elongated hollow shell, one part of said shell being provided with a screw engaging portion, a transparent inner tubular member closed at one end and provided at the other end with a screw portion for engaging the screw engaging portion in said one part of said shell, and a cap cooperating with said screw portions for sealing the inner tubular member with a water-tight seal, said shell being provided with apertures for permitting the flow of water between the shell and the inner tubular member.

16. A fishing lure including a multi-part elongated hollow shell, one part of said shell being provided with a screw engaging portion, a transparent inner tubular member closed at one end and provided at the other end with a screw portion for engaging the screw engaging portion of said one part of said shell, and a cap cooperating with said screw portions for sealing the inner tubular member with a water-tight seal, said shell being provided with apertures for permitting the flow of water between the shell and the inner tubular member, and a tail piece mounted on and engaged with said shell and comprising a tubular member positioned on said shell and provided with rearwardly extending flexible streamer elements, and resilient means carried by said shell for normally clamping said tail piece against said shell but arranged for permitting ready removal of said tail piece from said shell.

17. A fishing lure including a hollow shell comprising a two-part housing, one part of the housing consisting of a transparent portion and the other part of an opaque portion, an inner transparent tubular member within said housing and containing an illuminating device and mounted in spaced relation with said housing, and apertures in said housing for permitting the flow of water through said housing and between the housing and the inner transparent tubular member.

18. A fishing lure comprising an outer housing consisting of a transparent portion and a hollow metal portion, a transparent inner tubular member supported within said housing and in spaced relationship with the metal portion of said housing, said metal portion having apertures for permitting the flow of water into said outer housing and between the outer housing and the inner tubular member, and a tail portion comprising a collar having rearwardly extending flexible streamer elements secured to said collar, said housing having a spring clip arrangement for securing the collar to the housing.

19. In combination with a fishing lure, a cradle member having transverse flexible spring clips, a battery supported within said clips, a second pair of spring clips on one end of said cradle and a light bulb supported by said second pair of clips, and a bow spring element on the other end of said cradle to force said battery and bulb in contact with each other to complete a circuit through said bulb.

WILLIAM W. VAN der CLUTE.